United States Patent Office 3,513,712
Patented May 26, 1970

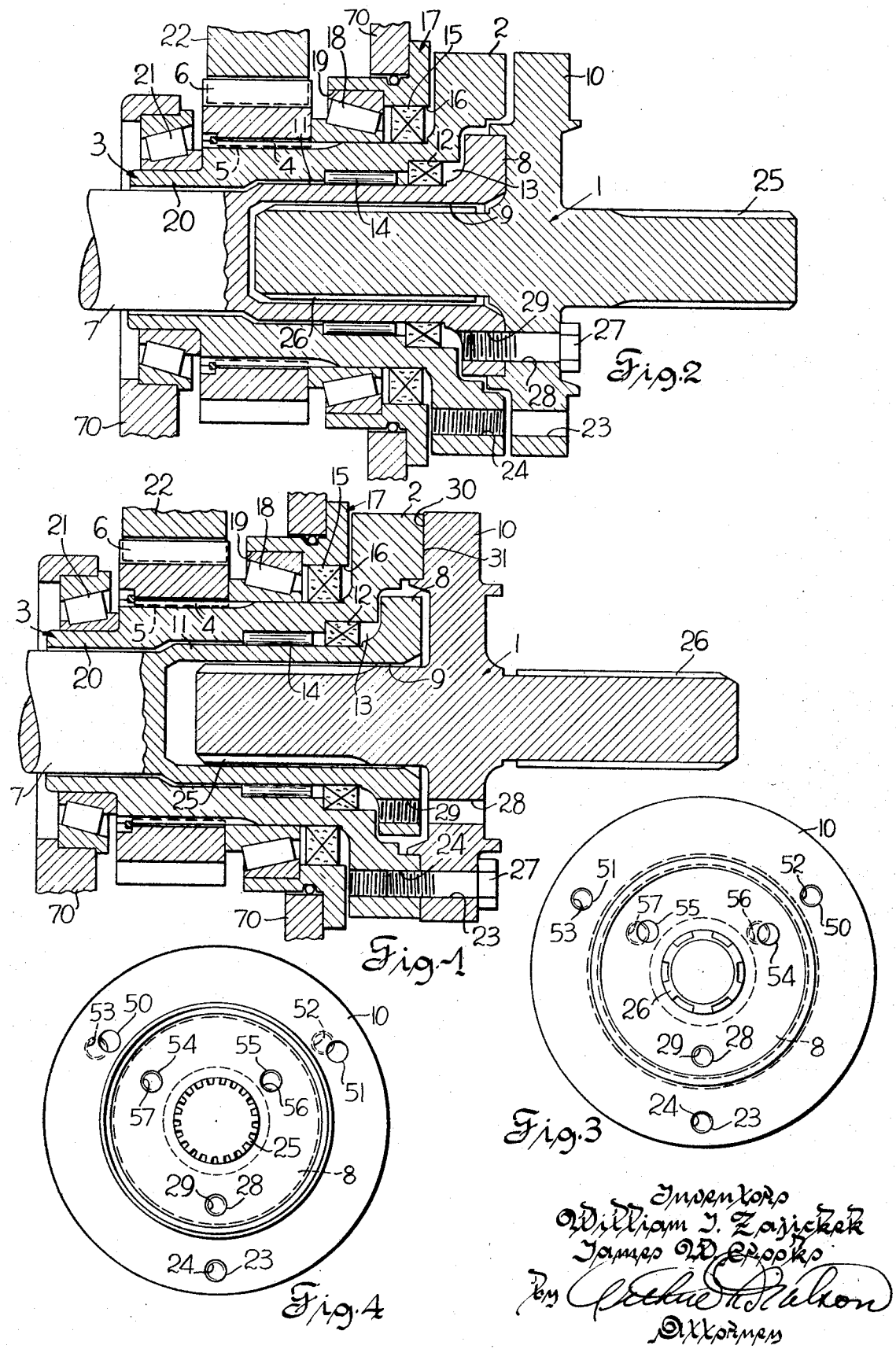

1

3,513,712
POWER TAKE-OFF ASSEMBLY
William J. Zajichek, Milwaukee, and James W. Crooks, Whitefish Bay, Wis., assignors to Allis-Chalmers Manufacturing Company, Milwaukee, Wis.
Filed Oct. 11, 1968, Ser. No. 766,864
Int. Cl. F16h 37/04, 37/06
U.S. Cl. 74—15.2                                    10 Claims

ABSTRACT OF THE DISCLOSURE

A reversible power take-off shaft having two standard spline ends and attaching means for correlating the proper drive speed to the spline extending from a drive assembly. A radial flange formed on a double ended shaft having holes unequally spaced provide a means for selectively bolting the power take-off shaft to one of two output drive shafts.

---

This invention relates to a power take-off shaft and more particularly to a reversible stub shaft having an adapter to correlate the speed of the driving shaft driving the adapter to the spline end extending from the power tak-off assembly for coupling to an implement.

Power take-off assemblies for use in combination with tractors have been used for a number of years. The shafts and splines for coupling the implement to the power take-off shaft from the tractor have been standardized. Originally the spline end was a 6-tooth spline driven at a standard speed of 540 r.p.m. This standard was accepted universally to provide a convenience for interchanging and connecting various models and brands of equipment.

With increased power requirement for power delivery from the tractor in accordance with the increased size of the tractor engine a new standard has been introduced. The new standard is a 21-tooth spline operating at 1,000 r.p.m. Since the standard 540 r.p.m. 6-tooth spline is generally in use and is still being manufactured for some units it is still necessary to provide this type of a power take-off shaft on tractors. It is also understood that the 1,000 r.p.m. 21-tooth spline is also in common use today and accordingly some form of adapting the tractor to provide power under both standards is necessary. Although some tractors are presently manufactured with a mechanism for converting the output drive for 540 or 1,000 r.p.m. output, these output drives are not entirely satisfactory. Accordingly this invention provides improved operation of a power take-off assembly which will deliver shaft rotation speeds of 540 r.p.m. and 1,000 r.p.m. A reversible power take-off shaft is used in combination with two output drive shafts with means for attaching to either of two output drive shafts. The attaching means correlates the spline end extending from the power take-off assembly to the drive shaft which is rotating at the proper speed.

It is an object of this invention to provide a reversible power take-off shaft and adapter for alternate connection to either a first output drive, or a second output drive while positioning the proper spline end for coupling to an implement.

It is another object of this invention to provide a reversible 6-tooth and 21-tooth power take-off shaft having an adapter for alternate connection to the standard 540 or 1,000 r.p.m. speed output to drive the spline end extending for external coupling at the proper speed.

It is another object of this invention to provide a two spline end power take-off shaft integral with an adapter to selectively engage a first and a second output drive means while the mating spline extends from the vehicle for external coupling.

The objects of this invention are accomplished by providing a power take-off assembly having a first output drive driving at a standard 540 r.p.m. and a second output drive driving at a standard 1,000 r.p.m. A reversible power take-off shaft having radial flange intermediate the two end portions is adapted for connection to either the 540 or the 1,000 r.p.m. output drive. The adapter flange is constructed in such a manner that when the 1,000 r.p.m. 21-tooth spline end extends from the assembly only the 1,000 r.p.m. output drive can be connected to the flange. Conversely when the 540 r.p.m. 6-tooth spline extends from the assembly only the 540 output drive can be connected to the adapter flange. Accordingly the assembly is providing constantly a 540 and 1,000 r.p.m. output drive but only the proper speed drive is connected to the adapter flange to provide the desired output for coupling to an implement. It is understood that the invention is not limited to the two speeds as indicated above.

Preferred embodiment of this invention is illustrated in the attached drawings.

FIG. 1 shows a reversible power take-off shaft with an adapter flange connected for a 540 r.p.m. output.

FIG. 2 is a view illustrating the adapter flange connected for 1,000 r.p.m. output.

FIG. 3 is an end view showing the adapter flange positioned for connection to the 540 r.p.m. output.

FIG. 4 is a view illustrating the adapter flange positioned for connection to the 1,000 r.p.m. output.

Referring to the drawings FIG. 1 shows the output drive wherein the reversible power take-off shaft 1 is connected to the 540 r.p.m. drive flange 2. The 540 r.p.m. drive flange 2 is integral with the sleeve 3 forming a spline 4 on its external periphery which mates with the internal spline 5 of gear 6. The gear 6 is adapted for being driven by the tractor through gear 22 at the 540 r.p.m. speed.

The tractor also drives the shaft 7 at a 1,000 r.p.m. through a suitable drive mechanism. The shaft 7 defines a 1,000 r.p.m. drive flange 8 which is connected to the reversible shaft 1 as shown in FIG. 2. The shaft 7 is formed with a central opening 9 which receives the stub end of the shaft 1 having a 21-tooth spline as shown in FIG. 1. The spline portion received within the opening 9 is not in a driving position however and the drive is transmitted through bolts which bolt the flange 10 of shaft 1. The bolts for bolting the flange 10 will be more specifically described later.

The 1,000 r.p.m. drive flange 8 adjoins the axial sleeve portion 11 which is embraced by seal 12 which is located centrally within the opening 13 of the sleeve 3. A bearing 14 is also mounted between the sleeve 3 and sleeve portion 11 for alignment of the shaft 7 in sleeve 3.

The sleeve 3 is embraced by a seal 15 which is seated within a central opening 16 of the retainer 17. A bearing assembly 18 is received within the opening 19 of retainer 17 which also embraces the sleeve 3. Bearings 14 and 18 maintain a concentric rotation of the sleeve 3 and shaft 7.

The gear 6 provides the drive for the sleeve 3 and axial flange 20 is embraced by a third bearing assembly 21 which is seated within the housing 70 and maintains the concentrical alignment of the sleeve 3.

A reversible power take-off shaft 1 is shown mounted in FIG. 1 for 540 delivery. The adapter flange 10 is fastened by means of a plurality of bolts 27 which are received in the plurality of openings 23 and threadedly engaged the threaded opening 24 in the 540 r.p.m. drive flange 2. The 1,000 r.p.m. 21-tooth spline 25 is received within a central opening 9 of the shaft 7. The 540 r.p.m. 6-tooth spline extends from the power take-off assembly. The 6-tooth spline 26 is adapted for connection to a suitable implement.

Referring to FIG. 2 the reversible power take-off shaft 1 is shown with the 540 r.p.m. 6-tooth spline 26 received within the central opening 9. The adapter flange 10 is shown fastened to the 1,000 r.p.m. drive flange 8 by means of a plurality of bolts 27. The 1,000 r.p.m. 21-tooth spline 25 extends from the power take-off assembly. The 1,000 r.p.m. spline 25 is adapted for coupling to the implement and the drive is received from the shaft 7 which is driven at 1,000 r.p.m.

Referring to FIG. 3; when 540 spline end 26 is exposed for coupling to an implement; only holes 23, 50, and 51 on outer set of holes in the adapter flange 10 can be aligned with their matching threaded openings 24, 52, and 53 in 540 r.p.m. drive flange 2. When a plurality of bolts are inserted in holes 23, 50 and 51 in adapter flange 10 to threadedly engage openings 24, 52 and 53 in 540 r.p.m. drive flange 2; holes 28, 54 and 55 on inner set of holes in the adapter flange 10 cannot be aligned with threaded openings 29, 56, and 57 of 1,000 r.p.m. drive flange 8.

Referring to FIG. 4 the holes 23, 50 and 51 are misaligned with the threaded openings 24, 52, and 53 and consequently the bolts cannot be inserted in the holes 23, 50, and 51 to fasten the adapter flange 10 to the 540 r.p.m. drive 2 flange. It is further noted that the holes 28, 55, and 54 are all aligned with the threaded openings 29, 56, and 57 so that the plurality of bolts 27 can be inserted in the holes so the adapter flange 10 is fastened to the 1,000 r.p.m. drive flange 8. Accordingly it can be seen that when the 1,000 r.p.m. flange 8 is attached to the adapter flange 10 the 1,000 r.p.m. spline 25 is exposed for coupling to an implement. Also the 540 r.p.m. 6-tooth spline 25 is received in the opening 9.

The operation of this power take-off assembly will be described in the following paragraphs.

A suitable drive means from the tractor drives the gear 6 at 540 r.p.m. and also the drive drives the shaft 7 at 1,000 r.p.m. The two drive flanges 2 and 8 are driven at the corresponding rates of speed when the tractor is in operation and the drive means is connected for driving these two flanges. Suitable seals are used to seal these assemblies. The bearing assemblies maintain a concentric alignment within the retainer 17 and housing 70 by bearings as previously described.

The reversible power take-off shaft 1 is constructed in such a manner that either 540 6-tooth or the 1,000 r.p.m. 21-tooth spline will extend from the assembly. FIG. 1 shows the 1,000 r.p.m. spline received within a central opening 9 of shaft 7. The clearance between the external periphery of the spline 25 and central opening 9 is minimal and the alignment of the adapter flange 10 and the 540 r.p.m. drive flange 2 are constructed so that the radial facing 30 of flange 10 and the radial facings 31 of flange 2 fit accurately. The bolts 22 fasten these two flanges and transmit the power from sleeve 3 to the adapter flange 10. If desired a plurality of dowels might be used to transmit the power or any other mating type of engagement. It is not however a necessary part of this invention as the bolts can be constructed so that their alignment in the holes is accurate and there is a minimum amount of play between the flanges 2 and 10 when they are fastened together by the bolts 22.

In the position as shown in FIG. 1 the 540 r.p.m. 6-tooth spline 26 is in a position where it is adapted for coupling to an implement and the drive speed of the reversible power take-off shaft 1 will be 540 r.p.m.

If it is desired to use a 1,000 r.p.m. 21-tooth spline 25 for coupling to an implement then the shaft is reversed as shown in FIG. 2. The 540 r.p.m. spline 26 is inserted in the central opening 9 and the plurality of bolts 27 fasten the 1,000 r.p.m. drive flange 8 to the adapter flange 10. In this position the 1,000 r.p.m. speed of shaft 7 is transmitted through the bolts 27 to the power take-off shaft 1. The conversion from one speed drive to the other can be made in a matter of minutes. The bolts 27 are the same bolts only positioned in different holes to provide the coupling between the adapter flange 10 and the 540 r.p.m. or the 1,000 r.p.m. drive flange. It is noted that holes 28, 54, 55, 23, 50 and 51 are all on different radii, as well as their mating openings. Their angular spacings are also unequal. Accordingly, only a single set of holes and mating openings can be aligned at one time.

The power take-off assembly may be provided with the internal clutch to engage one or the other of the power take-off outputs or it may drive both of the power take-off outputs continuously. It is immaterial as far as the invention is concerned as to which type of a system is used. It is understood that the bearing seals and the general construction of the power take-off assembly is not changed in any way to shift from one speed to the other. Accordingly, there is a minimum of inconvenience to changeover from one speed to the other and also there is no seal problem as far as oil and grease dripping from the assembly when the mechanism is shifted.

The embodiments of the invention in which an exclusive property or privilege is claimed are defined as follows:

1. A power take-off assembly comprising a first drive shaft means defining a first set of unequally spaced openings and adapted for rotating at a first output speed, a second drive shaft means defining a second set of unequally spaced openings and adapted for rotating at a second output speed, alignment means concentrically aligning said two drive shaft means, a reversible power take-off shaft having a first spline end adapted for coupling to an implement to operate at said first speed and a second spline end adapted for coupling to a second implement to operate at said second speed, an adapter flange connecting said two spline ends defining holes positioned for matching said first set of unequally spaced openings and matching said second set of unequally spaced openings by reversibly positioning said power take-off shaft, means selectively and alternatively fastening said adapter flange to said first drive shaft means and said second drive shaft means while simultaneously positioning the mating spline end to extend from said assembly thereby correlating the drive from the drive shaft means with the mating spline end for selectively coupling to said implements.

2. A power take-off assembly as set forth in claim 1 wherein the fastening means includes a plurality of bolts for selectively fastening said adapter flange to one of said drive shaft means.

3. A power take-off assembly as set forth in claim 1 wherein said drive shaft means define flanges having mating surfaces for making positive drive engagement with said adapter flange and said mating surfaces at said adapter flange are offset axially to engage only one of said drive shaft means flanges at a time.

4. A power take-off assembly as set forth in claim 1, wherein said drive shaft means comprise a drive sleeve embracing a drive shaft, said drive shaft defines a central opening for receiving one end of said reversible power take-off shaft while the opposite end of said reversible shaft extends from the power take-off assembly for coupling to an implement.

5. A power take-off assembly as set forth in claim 1 wherein a concentric axial flange is formed on each side of the adapter flange to concentrically align with a mating axial flange on said drive snaft means.

6. A power take-off assembly as set forth in claim 1 wherein said drive shaft means and said adapter flange define unusual angularly spaced sets of openings and holes.

7. A power take-off assembly as set forth in claim 1 wherein said drive shaft means define radial facings in a common plane and the adapter flange facings are axially spaced relative to each other.

8. A power take-off assembly as set forth in claim 1 wherein the spline ends of said reversible power take-off shaft are the standard 6-tooth 540 r.p.m. spline and the standard 21-tooth 1,000 r.p.m. spline.

9. A power take-off assembly as set forth in claim 1 wherein said drive shaft means and said adapter flange define unequal radially spaced holes and openings in each set of holes and openings.

10. A power take-off assembly as set forth in claim 1 wherein each of said drive shaft means comprise separate sealed and axially aligned drive assembly with each driven at a predetermined speed.

References Cited

UNITED STATES PATENTS

| | | | |
|---|---|---|---|
| 2,975,643 | 3/1961 | Ferguson | 74—15.2 |
| 3,001,409 | 9/1961 | Fumetti | 74—11 |
| 3,002,393 | 10/1961 | Browning | 74—11 |
| 3,059,505 | 10/1962 | Reicks | 74—11 |
| 3,279,275 | 10/1966 | Christie | 74—15.4 |

LEONARD H. GERIN, Primary Examiner

U.S. Cl. X.R.

74—15.4, 15.69

PO-1050
(5/69)

UNITED STATES PATENT OFFICE
CERTIFICATE OF CORRECTION

Patent No. 3,513,712          Dated May 26, 1970

Inventor(s) William J. Zajichek and James W. Crooks

It is certified that error appears in the above-identified patent and that said Letters Patent are hereby corrected as shown below:

Column 4, line 57, "snaft" should read -- shaft --; line 60, "unusual" should read -- unequal --.

SIGNED AND
SEALED
SEP 15 1970

(SEAL)
Attest:

Edward M. Fletcher, Jr
Attesting Officer

WILLIAM E. SCHUYLER, JR.
Commissioner of Patents